United States Patent [19]

Delay, Sr.

[11] 4,300,597
[45] Nov. 17, 1981

[54] DUST COVER ASSEMBLY FOR QUICK DISCONNECT COUPLING

[75] Inventor: Duane M. Delay, Sr., Lincoln, Nebr.

[73] Assignee: Gould Inc., Rolling Meadows, Ill.

[21] Appl. No.: 39,855

[22] Filed: May 17, 1979

[51] Int. Cl.³ .................. B65D 51/18; F16L 55/10
[52] U.S. Cl. ..................................... 138/89; 220/337
[58] Field of Search ............... 138/89; 220/337, 344

[56] References Cited

U.S. PATENT DOCUMENTS

| 3,168,960 | 2/1965 | Dean et al. | 220/344 |
| 3,531,823 | 10/1970 | Cornelius | 220/337 |
| 3,777,926 | 12/1973 | Stieler et al. | 138/89 |
| 4,162,740 | 7/1979 | Jones | 220/337 |

FOREIGN PATENT DOCUMENTS 147541  6/1936  Austria ................................. 138/89

Primary Examiner—Steven L. Stephan
Attorney, Agent, or Firm—George P. Edgell; Kay H. Pierce; Edward E. Sachs

[57] ABSTRACT

A dust cover for a quick disconnect coupling in which a clamping means is attached to the female half of the coupler and supports spring means which closes the cover and aligns the same on two mutually perpendicular axes.

5 Claims, 6 Drawing Figures

DUST COVER ASSEMBLY FOR QUICK DISCONNECT COUPLING

BACKGROUND AND SUMMARY OF INVENTION

This invention relates to a dust cover for a quick disconnect coupling. "Quick-disconnect" or "breakaway" couplers are devices which allow separation of fluid conducting lines and which further seal both of the separated lines to prevent loss of fluid and also to prevent introduction of foreign material into the fluid system.

The "female" half of the coupler usually incorporates some sort of cavity into which the "male" half is inserted to re-connect the fluid lines. There is also some sort of locking device which maintains the connection. Since the cavity is open to atmosphere when the coupling is disconnected, it is necessary to provide a means of covering or blocking this cavity.

In the past, various types of plugs or covers have been used. This invention was conceived in an effort to provide a simple, dependable method of covering the cavity in the female half of the coupler when the coupler is disconnected. Past devices have fallen into three basic categories.

First were those devices, usually made of rubber or some other plastic material, which cover the open female half of the coupler and which incorporate a slit or flap through which the male half of the coupler is inserted. These are more or less permanently attached to the female coupler half. The rubber or plastic material deteriorates or tears, rendering the closure ineffective. The device accumulates fluid and dust in the area of the slit or flap, and upon insertion of the male half into the closure this accumulation of foreign material is forced ahead of the male half and into the system.

Second were those devices which consist of a metal, rubber, or plastic counterpart of the male half of the coupler (solid and without valving arrangement). These are usually attached to the female half of the coupler by a length of chain, wire or other such restraining method, to prevent loss of the part. These are merely "plugged-into" the female half to prevent introduction of dust and foreign material into the system. These devices are at best clumsy to use as they require the operator to physically and separately plug them into the female half, which he may forget to do. These devices are often lost when a restraining chain or other device is broken. This device also accumulates dust and foreign material as it hangs loose while coupler is connected. This material will be introduced into the system unless it is wiped off.

Third, were those devices similar to this invention, which consist of a pivoted cover, hinged at a location, such that they can be attached to the female half of the coupler and which close automatically upon withdrawal of the male half. Closure is usually by means of a spring arrangement. These devices are mainly ineffective because of misalignment on the face of the female coupler half, thereby leaving an opening through which dirt can enter the system. This is due to te single axis movement of the cover about the hinge pin.

The purpose and object of this invention is to provide an effective, permanent, and automatic means of protecting the system from contamination with sand, dust, and other foreign materials which accumulate at the female half of the coupler due to fluid spillage at the time of coupler disconnection. This is accomplished in three ways:

1. Permanent attachment to the female half of the coupler.
2. Automatic closure, independent of the initiative and direct actions of the operator.
3. Positive, dust-tight closure due to the unique self-aligning features described below.

According to the invention, a clamping means is mounted on the female half and provides a support for the pivotable cover and the actuating spring therefor. The unique design of the pivoting mechanism of the cover to the clamping means assures that the cover will close tight regardless of alignment due to the fact that this pivoting arrangement is free to move in two mutually perpendicular axes. Another unique feature which contributes to the effective closure of cover is that the actuating spring exerts its entire force directly in the center of the cover, thereby distributing that force equally upon all points of contact between the cover and the face of the female half of the coupler.

A search of the art revealed the following patents, none of which show the above novel combination of elements nor teach the advantages flowing therefrom:
U.S. Pat. No. 1,576,712;
U.S. Pat. No. 2,282,532;
U.S. Pat. No. 2,406,563;
U.S. Pat. No. 2,630,131;
U.S. Pat. No. 2,641,485;
U.S. Pat. No. 2,763,459;
U.S. Pat. No. 3,075,547;
U.S. Pat. No. 3,580,414;
U.S. Pat. No. 3,777,926;
U.S. Pat. No. 4,027,696.

DETAILED DESCRIPTION

The invention is described in conjunction with the accompanying drawing, in which.

Figure 1:
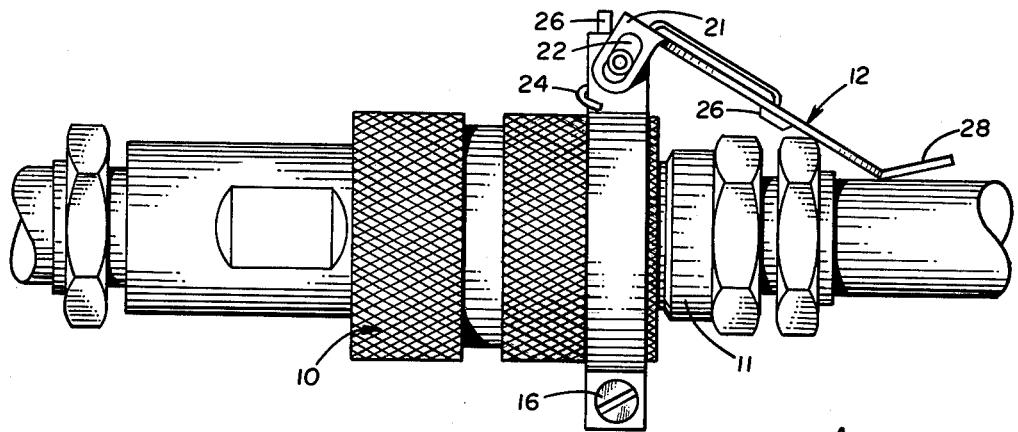
FIG. 1 is a fragmentary side elevational view of a quick disconnect coupling in assembled condition and which illustrates the inventive dust cover assembly.

In the illustration given and with reference to FIG. 1, the numeral 10 designates generally the female half and 11 the male half of a quick disconnect coupling. Details of the coupling which constitute no part of the instant invention can be seen in co-owned U.S. Pat. No. 4,099,433.

Figure 2:
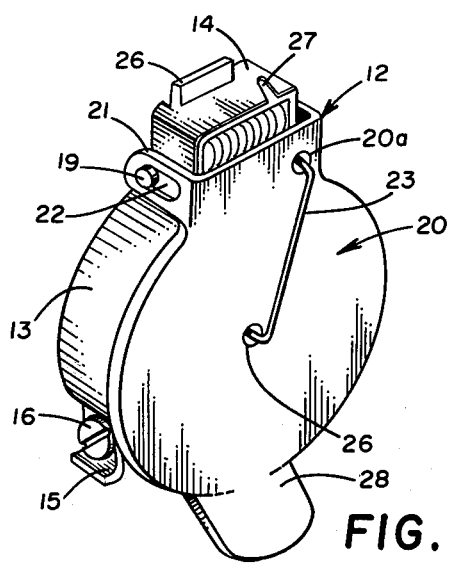
FIG. 2 is a perspective view of the inventive assembly.
Figure 4:
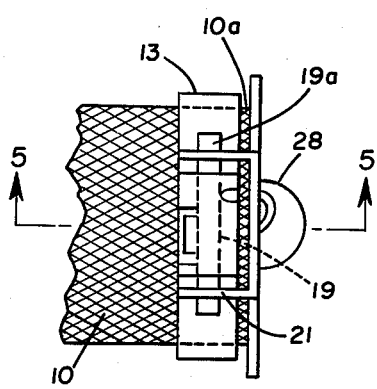
FIG. 4 is a fragmentary top plan view of the assembly on the female half.
Figure 5:
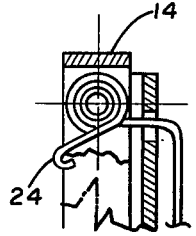
FIG. 5 is a fragmentary sectional view taken along the sight line 5—5 of FIG. 5.

The inventive dust cover assembly is designated 12 and is seen in the "open" condition of FIG. 1 where the coupling halves 10 and 11 are joined—and is seen in the "closed" condition in FIGS. 2, 4 and 5. It is mounted adjacent the open end of the female half 10.

Figure 3:
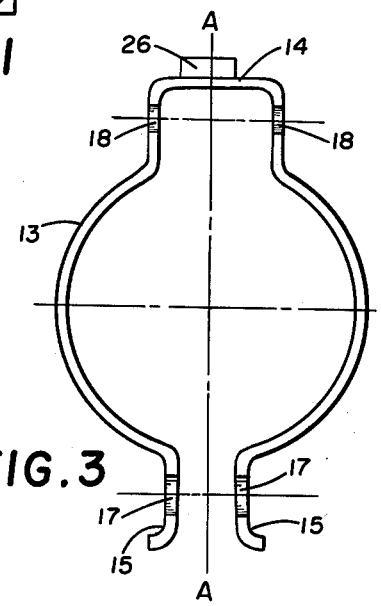
FIG. 3 is an elevational view of the clamping body portion of the inventive assembly.

Referring now to FIG. 2, the dust cap 12 includes a body 13 which serves as a clamping member to clamp the dust cover assembly 12 to the female half 10. The body 13 is seen in elevation in FIG. 3 and is generally U-shaped having a bight portion at the top constituting a bracket 14 and depending legs 15 which are adapted to be brought toward each other in to clamp the female half 10—this by means of a nut and bolt as at 16 or other clamping means. For this purpose, the legs 15 are apertured at 17.

Additional aligned apertures 18 are provided in the bracket 14 for the receipt of a pivot shaft 19—see particularly FIGS. 2 and 4. The shaft 19 is a longitudinally split hollow tube in the illustration given which is press fitted into the apertures 18 to provide stub ends as at 19a in FIG. 4.

The cover member portion of the assembly is generally designated 20 (see FIG. 2 in particular) and is generally plate-like or flat over most of its surface. Along its upper side the cover member 20 is equipped with integral ears 21 projecting generally perpendicularly away from the flat surface of the cover member 20. Each ear 21 is equipped with an elongated pivot opening 22 (see FIGS. 1 and 2) in which the stub-ends 19a of the shaft 19 are received—thereby constituting cooperating pivot means on the clamping member 13 and the cover member 20.

More particularly, the elongated openings 22 not only permit the cover member to pivot from the open position of FIG. 1 to the closed position of FIG. 2 through a vertical arc, i.e., an arc parallel to the axis of the cylindrical conduit constituting the female half 10—but also permit the cover member to rotate limitedly about a vertical axis A—A (see FIG. 2), i.e., through a horizontal arc. This action not only compensates for any skew in mounting the body 13 on the female half 10 but also for any skew or other irregularity of the confronting edge of the open end of the female half 10 on which the cover member seats when in closed condition. For example, the body 13 is mounted closely adjacent the open end of the female half 10—see FIG. 4—but spaced therefrom to provide a projecting portion 10a. Also by virtue of the elongated openings 22, the amount of this projection is not critical.

Figure 6:
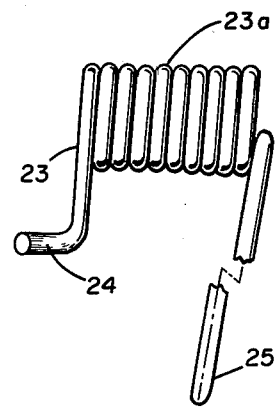
FIG. 6 is an elevational view in fragmentary form of the spring used in the illustrated embodiment.

A spring element 23 is interconnected between the bracket 14 and the cover member 20, the spring 23 being seen in fragmentary elevation in FIG. 6. The spring 23 has a coiled central portion 23a ensleeved on the shaft 19 and a pair of ends 24 and 25. The end 24 is hook-shaped to engage a portion of the bracket 14 as seen in FIGS. 1 and 5. The other spring end 25 extends through an opening 20a (see FIG. 2) in the cover member 20 and over a substantial portion of the flat surface thereof to terminate in an indentation 26 in the cover member. The indentation 26 is generally aligned with the axis of the cylindrical conduit constituting the female half 10.

In operation, the cover member 20 covers the entire face and opening of the female half of the coupling, thereby excluding any and all sand, dust, or other foreign material from the system. By virtue of the pivot means including the shaft 19 and the aligned, elongated openings 22 in the ears 21, the cover member can be lifted from the opening of the female half of the coupling permitting insertion of the male half of the coupling. This cover device is then held open by the male half of the coupling and its attachment to the fluid conducting line—see FIG. 1.

The actuating spring 23 automatically closes the cover member when the male half 11 of the coupling is withdrawn from the female half 10. The force exerted by this actuating spring 23 is sufficient to insure a tight and close contact of the cover member and the female half 10. The unique design of the pivoting mechanism of the cover member to the clamping means 13 assures that the cover will close tight regardless of alignment due to the fact that this pivoting arrangement is free to move about two axes. This is accomplished by openings or slots 22 in the cover member which allows free movement of the ears 21 about the stub ends 19a upon which it pivots. As pointed out previously, the actuating spring 23 exerts it entire force directly in the center of the cover member thereby distributing that force equally upon all points of contact between the cover member and the face of the female half 10 of the coupling. This also is enhanced by the unique slots in the pivot arrangement.

The advantages of this invention over previous designs are:

A. Fluid is not accumulated in the female half. Fluid that is spilled at disconnect is vented to atmosphere at the next connection.

B. Dust, sand, and foreign materials are not injected into the system, as the male half of the coupling does not come into contact with the outside of the cover during reconnection.

C. There is no bothersome or clumsy action necessary in closing the female coupler half at disconnection as operation of the device is fully automatic. The operator cannot forget to close the coupling.

D. The device cannot be lost as it is attached directly to the coupling.

E. There can be no misalignment to leave gaps between the cover member and the coupling due to the unique design.

To further protect the spring 23 against undue stress, an abutment 26 is provided on the bracket 14 by upsetting a portion thereof as can be best seen in the upper portion of FIG. 2. Also the bracket 14 along the edge opposite the abutment 26 is equipped with a notch or recess 27 adapted to accommodate a portion of the spring 23 when the cover member 20 is pivoted to full open position.

Facilitating the pivoting of the cover member 20 to open position is the provision of an integral, angled tab 28 on the cover member 20. More particularly, the cover member 20 is generally circular in outline with the pivot means, i.e., the ears 21 being located near the top thereof. The tab 28 is located at the bottom—diametrically opposite the pivot means. The tab 28 not only provides a convenient means for grasping the cover member 20 to pivot it to open position but also serves as a ski means for further easily moving the male half 11 therepast incident to insertion.

By virtue of providing the aperture 20a in a location adjacent one ear but between the ears 21, the length of the spring 23 is minimized and makes possible the imposition of closing force at the optimum position at about the center of the cover member 20.

While in the foregoing specification a detailed description of an embodiment of the invention has been set down for the purpose of explanation; many variations in the details hereingiven may be made by those skilled in the art without departing from the spirit and scope of the invention.

I claim:

1. A dust cover assembly for a relatively elongated, generally cylindrical open-ended conduit comprising: a clamping member for mounting said assembly encircling said conduit adjacent said open-end; a cover member equipped with an indention generally aligned with the axis of said conduit; pivot means cooperatively interconnecting said clamping member and said cover member, said pivot means including a pair of transversely spaced-apart ears on one member, said ears each having a longitudinally elongated pivot opening, and the other member having a pivot shaft outside said cylindrical conduit and extending transversely to the axis of said conduit, said pivot shaft being slidably pivotally mounted in said pivot openings so that the cover member is rotatable with respect to the clamping member about two mutually perpendicular axes and the cover member will align with and effectively close the open end of the conduit when the cover member is in a closed position relative to said open end; and a spring having one end engaging said clamping member and another end being received in said indention of said cover member urging said cover member into a closed position relative to said open end, said clamping member being equipped with a recess for accommodating said spring when said cover member is pivoted to an open position.

2. The structure of claim 1 in which said cover member has a relatively flat surface portion and said spring means other end extends a substantial distance over said flat surface portion.

3. The structure of claim 1 in which said cover member is equipped with an integral tab on the side thereof opposite said pivot means.

4. The structure of claim 1 in which said conduit is the female half of a quick-disconnect coupling.

5. The structure of claim 1 in which said cover member is generally circular in elevation.

* * * * *